United States Patent Office 2,804,347
Patented Aug. 27, 1957

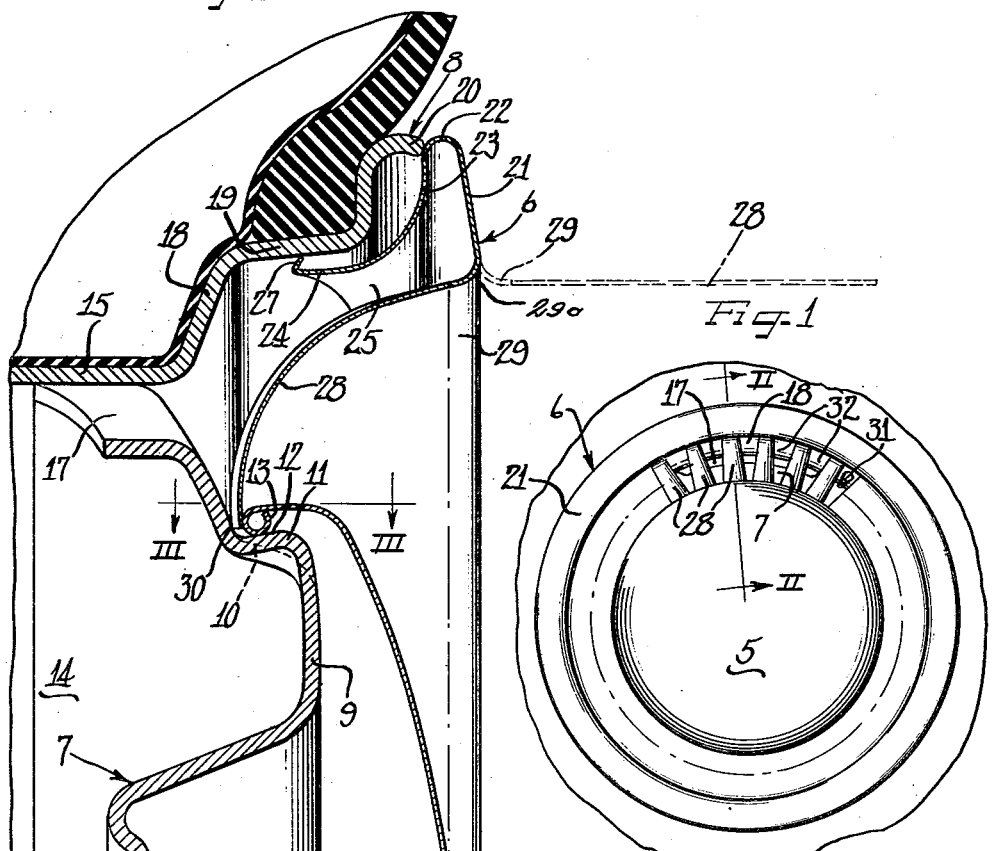
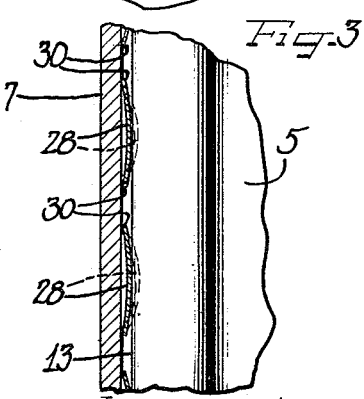

2,804,347

WHEEL COVER

George Albert Lyon, Detroit, Mich.

Application April 27, 1954, Serial No. 425,866

11 Claims. (Cl. 301—37)

The present application relates to improvements in wheel structures and more particularly concerns the ornamental and protective covering of the outer sides of vehicle wheels.

An important object of the present invention is to provide a vehicle wheel structure wherein the outer side of the wheel is covered in a manner to enable circulation of air through the wheel.

Another object of the invention is to provide an improved wheel structure and a cover assembly for the outer side of the wheel providing for circulation of air through the cover and through openings in the wheel.

A further object of the invention is to provide an improved cover assembly for the outer side of a vehicle wheel.

Still another object of the invention is to provide an improved trim structure for vehicle wheels.

It is another object of the invention to provide an improved trim structure for vehicle wheels having means to retain the trim against turning on the wheel in service.

Other objects, features and advantages of the present invention will be readily apparent from the following detailed description of a preferred embodiment thereof taken in conjunction with the accompanying drawings, in which:

Figure 1 is a side elevational view of a wheel structure embodying features of the invention;

Figure 2 is a fragmentary radial sectional view taken substantially on the line II—II of Figure 1; and Figure 3 is a fragmentary sectional detail view taken substantially on the line III—III of Figure 2.

According to the present invention an improved cover assembly, comprising a hub cap 5 and a trim ring 6, is adapted to be disposed at the outer side of a vehicle wheel comprising a wheel body 7 and a tire rim 8. By preference, the wheel is of the general type covered in my Patent 2,445,330 issued July 20, 1948 wherein the wheel body 7 has an annular nose bulge 9 provided at the radially outer side thereof with a generally radially outwardly facing annular shoulder 10 having at uniformly spaced intervals such as 3 or 4 radially outwardly directed cover-retaining bumps 11 provided with generally radially and axially inwardly sloping cover-retaining shoulders 12 which are offset radially outwardly relative to the annular shoulder 10 on the nose bulge. The hub cap 5 has on the margin thereof an underturned reinforcing resilient bead 13 by which the hub cap retainingly engages in snap-on pry-off relation with the retaining bumps 11.

Radially outwardly from the shoulder 10 the wheel body 7 extends radially outwardly to a generally axially inwardly directed attachment flange 14 which is secured in suitable manner to a base flange 15 on the tire rim. At suitable intervals such as 3 or 4 the attachment flange 14 is inset to provide air circulation openings 17.

The tire rim 8 is of the multi-flange drop-center type having an outer side flange extending generally radially outwardly from the base flange 15 as indicated at 18 and merging with a generally axially outwardly and radially outwardly sloping intermediate flange 19 from the outer margin of which extends a terminal flange 20 generally radially outwardly and axially outwardly.

For ornamentally overlying the tire rim 8 and the portion of the wheel body 7 between the juncture with the tire rim and the portion of the wheel body covered by the hub cap 5, the trim ring 6 has an annular body portion 21 which is of a diameter to substantially overlie the terminal flange 20 of the tire rim and is provided with a turned bead-like outer marginal extremity 22 leading into a generally radially inwardly and axially inwardly turned resilient flange 23 extending inwardly over the terminal flange 20 and around the juncture of the terminal flange with the intermediate flange 19 and is provided with a series such as 8 to 16 generally axially inwardly directed resilient cover retaining fingers 24. These fingers all extend from a continuous generally axially inwardly directed portion 25 of the trim ring flange 23 and have short and stiff generally radially and axially outwardly angled retaining terminals 27 which engage under resilient thrust edgewise in retaining gripping engagement against the terminal flange 19. To apply the trim ring 6 it is generally centered with respect to the wheel and the terminal flanges 27 of the retaining fingers cam axially inwardly along the sloping surface of the intermediate flange 19 and thereby place the retaining fingers 24 under radially inward resilient deflection and thus tension working radially outwardly against the tips of the terminal flanges 27.

Removal of the trim ring 6 from the wheel is accomplished by inserting a pry-off tool behind the turned margin 22 of the trim ring and exerting pry-off leverage which will cause the retaining fingers 24 to release their grip on the intermediate flange of the tire rim.

For bridging the gap between the annular trim ring body 21 and the adjacent margin of the hub cap 5, the trim ring is provided with a series of generally radially and axially inwardly extending fairly closely spaced but preferably individual spoke-like extensions 28 from a generally radially and axially inwardly directed flange 29 at the inner margin of the trim ring body 21 and joining such margin on a reinforcing annular rib-like juncture 29a.

In the manufacture of the trim ring 6, the flange 29 and the extensions 28 may be formed to extend originally generally axially outwardly from the trim ring body 21 as shown in dash outline in Fig. 2. This enables the trim ring to be made as a rolled section from strip stock. Then the flange 29 and the extensions 28 are bent inwardly and shaped to the final shape shown in full outline and with the extensions preferably curved inwardly in bowed formation as shown to engage against the wheel body 7 behind the hub cap bead 13 when the hub cap is on the wheel.

The construction and relationship of the spoke-like extensions 28 is such that when the hub cap 5 is pressed into position on the wheel, by snapping of the bead 13 over the retaining bumps 11 and drawing of the bead 13 axially inwardly toward the wheel body adjacent the bases of the retaining faces or shoulders 12 of the bumps, the inner extremities of the spoke extensions 28 will be clamped against the wheel body. As an incident to such clamping of the inner terminals of the spoke extensions, a gripping engagement of the wheel body is effected which will effectively hold the trim ring against turning. This is accomplished by having the spoke extensions 28 of transversely arched or humped or bowed shape so that respective side edges 30 at the opposite longitudinal sides of the extensions will be driven more or less bitingly against the wheel body as shown in Figs. 2 and 3.

Initially the cross-sectionally arched condition of the extensions 28 is more pronounced or greater than the ultimate space therefor between the hub cap bead and the underlying portion of the wheel body so that the bead due to the resilient tension and axially inward drawing thereof in engagement with the retaining bumps 11 will compress the engaged terminal portions of the spoke extensions 28 substantially as indicated in Fig. 3, from the dot-dash position to the full line position. Since the spoke extensions are of resilient structure, they will spring back substantially to the normal condition when the hub cap is released therefrom. Furthermore, the resilient tension to which the extensions are subjected as a result of the compression by the hub cap bead causes the edges 30 to grip thoroughly against the wheel body and thus effectively resist turning of the trim ring 6 relative to the wheel. This is a valuable feature since thereby distortion of a valve stem 31 projecting through one of the apertures or radial openings 32 between the spoke extensions 28 will not be distorted in service.

It will be observed that the openings 32 afford substantial air circulation passages through the cover assembly and more particularly the inner portion of the trim ring 6, cooperatively with the wheel openings 17 which the spoke extensions 28 overlie. The air circulation feature is enhanced by having the spoke extensions 28 of narrow width at juncture with the trim ring flange 29 and flaring to greater width at their inner extremities whereby the openings 32 are of maximum width between the spoke extensions at the radially outer ends of the openings where maximum air circulation is enabled therethrough.

At their inner extremities the spoke extensions 28 are preferably spaced apart so that a pry-off tool such as a screwdriver may be levered directly against the wheel body 7 in applying the tool to the bead 13 of the hub cap for prying the hub cap free from the retaining bumps 11 when it is desired to remove the hub cap. After removal of the hub cap, the trim ring 6 will remain in place on the wheel, unless it is desired to remove the same by prying the same free from the wheel as described hereinabove.

It will be understood that modifications and variations may be effected without departing from the scope of the novel concepts of the present invention.

I claim as my invention:

1. In a wheel structure including a wheel body and a tire rim, a hub cap for disposition over the wheel body and having means thereon retainingly engageable with means on the wheel body for retaining the hub cap in place, and a trim for disposition over the tire rim and having a series of generally radially inwardly extending extensions having terminals thereon for engaging between the hub cap and the wheel body, said terminals having edges directed generally axially inwardly toward the wheel body and acting under pressure from the hub cap to substantially anchor the extensions and thereby the trim against turning relative to the wheel.

2. In a wheel structure including a multi-flanged tire rim and a wheel body having cover-retaining bumps thereon directed generally radially outwardly, a hub cap for disposition at the outer side of the wheel and having a resiliently beaded margin retainingly engageable with said bumps, and a trim for disposition opposite the tire rim and having marginal extension structure thereon for underlying the hub cap bead and opposing a generally axially outwardly facing portion of the wheel body and including edge means directed generally axially inwardly and engageable under compression from the hub cap bead bitingly against the axially outwardly facing portion of the wheel body for holding the trim against turning relative to the wheel.

3. In a wheel structure including a wheel body and a tire rim, a hub cap for disposition opposite the wheel body, a trim member for disposition opposite the tire rim, said trim member having a series of generally radially and axially inwardly directed extensions engageable under the hub cap and having means thereon operable under compression from the hub cap against an opposing underlying generally axially outwardly facing portion of the wheel body to anchor the extensions and thereby the trim ring against turning relative to the wheel.

4. In a wheel structure including a wheel body and a tire rim, a hub cap for disposition at the outer side of the wheel body, and a trim ring for disposition at the outer side of the tire rim comprising an annular body having at the outer margin thereof means for retainingly engaging the tire rim and a series of generally radially and axially inwardly directed spoke-like extensions overlying the juncture between the tire rim and the wheel body and provided with terminals retainingly engageable under compression between the hub cap and the wheel body, said terminals having edges thereon engageable with the wheel body under compression imposed by the hub cap to anchor the extensions against turning relative to the wheel and thereby holding the trim ring against turning relative to the wheel.

5. In a wheel structure including a wheel body and a tire rim, a hub cap for disposition at the outer side of the wheel body, and a trim ring for disposition at the outer side of the tire rim comprising an annular body having at the outer margin thereof means for retainingly engaging the tire rim and a series of generally radially and axially inwardly directed spoke-like extensions overlying the juncture between the tire rim and the wheel body and provided with terminals retainingly engageable under compression between the hub cap and the wheel body, said terminals having edges thereon engageable with the wheel body under compression imposed by the hub cap to anchor the extensions against turning relative to the wheel and thereby holding the trim ring against turning relative to the wheel, said extensions being of transversely arched form and said anchoring means at the terminals comprising side edges of the extensions at said terminals.

6. In a wheel structure including a tire rim and a wheel body with air circulation openings through the wheel adjacent juncture of the tire rim and wheel body, a hub cap for disposition at the outer side of the wheel body, and a trim ring for disposition at the outer side of the tire rim and having a series of generally radially and axially inwardly directed spoke-like extensions with substantial openings therebetween for cooperation with and opposite the openings in the wheel for air circulation, the inner end portions of said spoke extensions being engageable between the wheel body and the hub cap.

7. In a wheel structure including a tire rim and a wheel body with air circulation openings through the wheel adjacent juncture of the tire rim and the wheel body and with a hub cap cooperable in snap-on, pry-off relation with the wheel body radially inwardly from the wheel openings, a trim ring for disposition at the outer side of the tire rim, the trim ring having an annular body portion of substantially rigid cross-section including a generally axially outwardly facing main body portion with an underturned reinforcing outer marginal annular flange provided with inwardly extending cover retaining means engageable retainingly with the tire rim, the radially inner margin of the main body portion having a generally axially inwardly directed annular flange and joining the main body portion on a reinforcing annular rib-like juncture, said inner marginal flange having a series of circumferentially spaced resilient spoke-like extensions projecting therefrom and engageable with the axially outer portion of the hub cap, said spoke-like extensions defining therebetween openings opposite the wheel openings for air circulation therethrough.

8. In a trim ring for disposition at the outer side of a vehicle wheel including tire rim and wheel body parts with openings through the wheel adjacent juncture of the tire rim and wheel body, a trim ring body portion of annular form facing generally axially outwardly and having an outer marginal underturned flange provided with inwardly extending retaining means for engagement with the tire rim for retaining the trim ring thereon, and a radially inner marginal generally axially extending annular flange joining the trim ring body on a reinforcing annular rib-like juncture, said inner marginal flange having a series of circumferentially spaced generally radially and axially inwardly extending spoke-like extensions providing therebetween substantial openings for overlying the wheel openings and at their inner terminals cooperable with a hub cap on the wheel for affording the effect of a complete wheel cover with spokes.

9. In a wheel structure including a tire rim and a wheel body with openings through the wheel body adjacent the tire rim and a hub cap for snap-on, pry-off attachment to the wheel body inwardly from the wheel openings, the tire rim having a side flange from which a valve stem projects, a trim ring for disposition at the outer side of the tire rim having a circular body portion for generally overlying the radially outer portion of the tire rim radially outwardly from the valve stem and provided with a circumferentially spaced series of generally axially and radially inwardly directed spoke-like extensions providing substantial openings therebetween opposite the wheel openings for air circulation and for projection of the valve stem through one of said openings, said spoke-like extensions having inner terminals engageable behind the hub cap and having means thereon providing oppositely directed edges engageable with opposing portions behind the hub cap for retaining the trim ring against turning whereby to avoid distortion of the valve stem.

10. In a wheel structure including a wheel body and a tire rim, a hub cap for disposition over the wheel body and having means thereon retainingly engageable with means on the wheel body for retaining the hub cap in place, the wheel body and the hub cap having opposing generally axially facing portions thereof closely adjacent in the assembly, and a trim member for disposition over the tire rim and having at the radially inner side thereof means for engaging between said portions of the hub cap and the wheel body, said means including edges directed generally axially and disposed to be clamped under compression between said opposing generally axially facing portions for engaging in anchoring relation bitingly into one of said opposing generally axially facing portions for retaining the trim member against turning on the wheel.

11. In a wheel structure including a wheel body and a hub cap engageable thereon, a trim ring for disposition at the outer side of the wheel and including a ring body of sheet material having integrally in one piece therewith a series of generally radially inwardly projecting extensions at its inner margin engageable at their inner terminal portions between the wheel body and the hub cap cover, said extensions being transversely arched at their inner terminal end portions and with the sides thereof directed generally axially and providing sharp edges which are engageable as turn-preventing anchors by an engaged clamping surface incident to the clamping of the terminal portions between the hub cap and the wheel body.

References Cited in the file of this patent

UNITED STATES PATENTS

| | | |
|---|---|---|
| Re. 18,692 | Clark | Dec. 20, 1932 |
| 2,022,174 | Allee | Nov. 26, 1935 |
| 2,445,330 | Lyon | July 20, 1948 |
| 2,504,995 | Lyon | Apr. 25, 1950 |
| 2,544,703 | Lyon | Mar. 13, 1951 |
| 2,624,633 | Lyon | Jan. 6, 1953 |